Nov. 11, 1958    G. M. BUIVID    2,859,770
LOW PRESSURE RELIEF VALVE
Filed Nov. 30, 1956

INVENTOR.
GEORGE M. BUIVID
BY Wade Koonty
Frank C. Leach jr.
ATTORNEYS

United States Patent Office 2,859,770
Patented Nov. 11, 1958

2,859,770

LOW PRESSURE RELIEF VALVE

George M. Buivid, Moorestown, N. J., assignor to the United States of America as represented by the Secretary of the Air Force Application November 30, 1956, Serial No. 625,571

1 Claim. (Cl. 137—508)

This invention relates to a pressure relief valve, and more particularly, to a pressure relief valve that operates in response to a very small pressure differential.

A pressure relief valve may be employed to maintain a low pressure differential between the container with which it is associated and the atmosphere. When it is desired to maintain such a low pressure differential, there exists the problem of maintaining a satisfactory unit pressure to open and seal the area at the orifice through which the fluid flows from the valve casing to the atmosphere. Previous attempts to solve this problem have resulted in complicated and cumbersome arrangements such as a single stretched impervious diaphragm balanced by an adjustable spring or a close tolerance piston actuated valve. The present invention satisfactorily solves this problem by providing a very high per unit pressure to open and seal the area at the orifice of the valve while the valve responds to a very low pressure differential. This is accomplished by making the area of the orifice insignificant in comparison with the area exposed to the pressure differential.

An object of the present invention is to provide a pressure relief valve that responds to a low pressure differential but maintains a very high per unit pressure to open and seal the area at the orifice through which the fluid flows from the valve casing.

Other objects of this invention will be readily perceived from the following description.

This invention relates to a valve comprising a casing having a movable valve seat and a stationary valve head mounted therein. Fluid flows into the casing through a passage in an adjustable plug which carries the valve head. A bellows is secured to the casing, forms a wall thereof, and carries a movable valve seat secured thereto to cooperate with the stationary valve head. The bellows responds to a small pressure differential between the interior of the casing and the exterior thereof to move the valve seat from the valve head to permit fluid flow from the interior of the casing to the exterior thereof.

Figure 1:
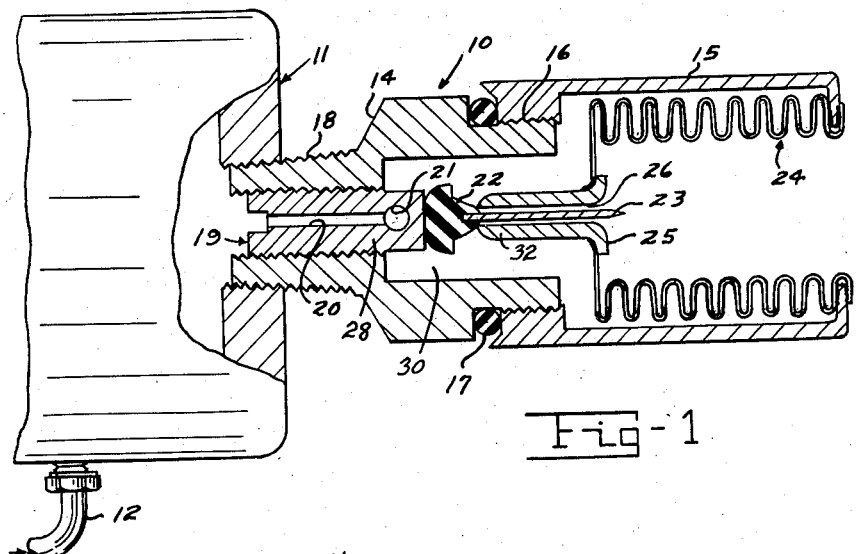
Figure 2:
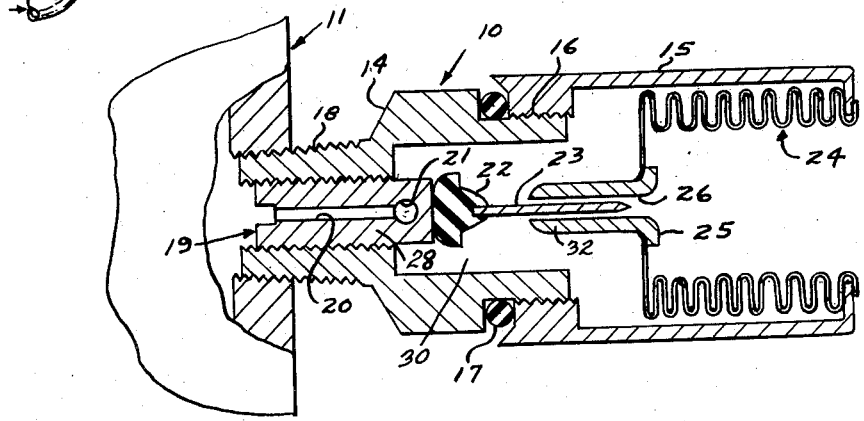

The attached drawing illustrates a preferred embodiment of the invention, in which Fig. 1 is a sectional view of the valve of the present invention in its closed position; and Fig. 2 is a sectional view of the valve in an open position.

Referring to the drawing, there is shown a casing of a valve 10 secured to a container 11 such as a pressurized tank, for example. Pressurized fluid such as air is supplied to the container 11 through a pipe or line 12. The casing of the valve 10 includes a first portion 14 and a second portion 15 secured together preferably by cooperating threads 16. An "O" ring 17 is disposed between the portions 14 and 15 of the casing to prevent any leakage through the threads 16 from the interior of the casing.

The casing of the valve 10 is attached to the container 11 by a threaded end 18 of the first portion 14. The threaded end 18 of the first portion 14 also has threads on its interior surface engaging exterior screw threads of a valve head carrying plug 19. The plug 19 has a valve head 22 attached thereto and is provided with an unthreaded end 28 which protrudes into the interior chamber 30 of the valve casing 10. The plug 19 has a fluid passage therethrough which may be comprised of two or more sections. In the preferred embodiment shown in the drawing an axially extending duct 20 terminates short of the end of the plug 19 in a transversely extending duct section 21. The transverse duct 21 is located in this end section so that communication is established between the tank 11 and the chamber 30.

As is readily obvious from the drawing, the plug member 19 is adjustable merely by adjusting the plug member 19, for example, with a screw driver. If desired, an adjustable screw driver could be permanently mounted in the container 11 with its end portion inserted within the passage 20 of the valve seat 19 and its operating handle extending outside of the container 11; it would only be necessary to seal the screw driver by an "O" ring, for example, where it extends through the wall of the container 11.

The plug 19 has a resilient valve head 22, preferably of rubber, attached to the end thereof. A guide member 23 is embedded within the resilient valve head 22 and extends therefrom in the opposite direction from the plug 19. A bellows 24 is secured to the outer end of the portion 15 of the casing, preferably by soldering, to form a resilient casing wall and a chamber 30. A tubular member 25 having a passage 26 extending therethrough is secured to the other end of the bellows 24, preferably by soldering. The tubular member 25 is provided on its interior end with a valve seat 32. The guide member 23 extends into the passage 26 to insure proper seating and proper contacting between valve head 22 and valve seat 32 and to form a centering device for the bellows 24.

It will thus be seen that fluid communication between the chamber 30 and the atmospheric air outside the casing 10 is established or cut off depending on the relative position of the valve head 22 and valve seat 32, and that the normal position of the valve is closed. The valve is open only when the bellows is subjected to a pressure from within the tank 11 communicated to the chamber 30 which subjects the bellows 24 to a contracting pressure. As is readily evident, the bellows 24 has a large area exposed to the pressure differential between the interior of the casing of the valve 10 and the exterior thereof in comparison with the area of the passage 26, which serves as an orifice. Thus, the total force developed over the large area of the bellows by the low pressure differential is employed to open and seal the area of the passage 26 with a very high per unit pressure since the area of the passage 26 is insignificant in comparison with the area of the bellows 24 exposed to the pressure differential. Such an arrangement permits the valve to effectively seal and to positively open in response to a small pressure differential between the interior and exterior of the casing. Adjustment of the plug member 19 is employed to change the distance the member 25 must travel to effect contact between the valve head 22 and valve seat 32, and therefore to change the pressure differential required to open and close the valve. Thus, the farther the adjustable plug 19 is advanced into the chamber 30 of the valve 10, the greater the pressure differential required to open the passage 26 to permit flow from chamber 30 to the outer atmosphere.

In the operation of the present invention, the plug 19 is adjusted, preferably before installation in the tank 11, to regulate the pressure differential at which the passage 26 is opened. Since the pressure within the tank 11 is communicated to the chamber 30 through passages 20 and 21, the pressure in these two areas will be equalized. An increase in pressure beyond the desired pressure differential with respect to the ambient air results in the bellows 24 being compressed sufficiently by the pressure differential to move the tubular member 25 away from the resilient head 22 to permit venting of the interior of the container 11 through the passage 26. The valve 10 is shown in its open position in Fig. 2 wherein it will be observed that the guide member 23, which is disposed within the interior of the passage 26 of the tubular member 25, keeps the bellows 24 centered. As soon as the interior of the container 11 is reduced to the desired pressure, the pressure differential between the interior of the casing of the valve 10 and the exterior thereof is insufficient to hold the resilient bellows 24 in the contracted position of Fig. 2. The bellows 24, which has sufficient bias of its own to maintain the valve head 22 and valve seat 32 in contact and therefore closed at the desired pressure differential, then expands to the position of Fig. 1.

One specific example of the use of the valve of the present invention is in cooperation with electronic equipment, which is pressurized to preclude the entry of moisture to the interior of the container housing the electronic equipment and to enhance the dielectric qualities of dry air under pressure. The valve of the present invention is employed to "bleed off" air due to internal and external heat causing dangerously high differential pressures on the container in which the electronic equipment is housed. This valve also protects such equipment when it is transported by aircraft at high altitudes.

An advantage of this invention is that it is compact and lightweight in comparison to prior art low pressure relief valves. Another advantage of this invention is that it eliminates high friction sliding seals in low pressure relief valves.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

A relief valve assembly unit attachable to a container, said unit comprising a casing, a chamber in said casing, a valve in said casing for controlling fluid flow from said chamber to the outer atmosphere, said valve comprising a valve head and a valve seat, said valve head being secured on a valve head carrying plug, said plug having a passage therein to permit uninterrupted fluid communication between said container and said chamber, a bellows secured at the outer end of said casing, and forming a closing wall for said casing, an elongated valve seat mounted on the interior end of said bellows for supplying communication between said chamber and the outer atmosphere, and movable, responsive to pressure differential between said chamber and the outer atmosphere to open and close said valve, an elongated spear shaped member extending from said valve head for entering said elongated valve seat to center said bellows member and insure proper contact of valve head and valve seat.

References Cited in the file of this patent

UNITED STATES PATENTS

| | | |
|---|---|---|
| 1,472,366 | Kelsey | Oct. 30, 1923 |
| 2,165,995 | Canetta | July 11, 1939 |
| 2,538,436 | Weinberg | Jan. 16, 1951 |